United States Patent [19]

Pennings et al.

[11] Patent Number: 5,113,509
[45] Date of Patent: May 12, 1992

[54] METHOD OF CHANGING DATA ON DISK

[75] Inventors: Henricus M. Pennings, BD Hilversum; Hubertus F. Wijnen, GL Linschoten, both of Netherlands

[73] Assignee: International Business Machines Corporation, Armonk, N.Y.

[21] Appl. No.: 30,398

[22] Filed: Mar. 26, 1987

[30] Foreign Application Priority Data

Apr. 4, 1986 [EP] European Pat. Off. .......... 86200577

[51] Int. Cl.$^5$ ............................................. G06F 12/02
[52] U.S. Cl. ..................... 395/425; 364/DIG. 2; 364/962.1; 364/958.1; 364/940.4; 364/931.46; 364/937.01
[58] Field of Search ... 364/200 MS File, 900 MS File

[56] References Cited

U.S. PATENT DOCUMENTS

| | | | |
|---|---|---|---|
| 3,662,401 | 5/1972 | Collins | 364/200 |
| 4,207,609 | 6/1980 | Luiz et al. | 364/200 |
| 4,224,664 | 9/1980 | Trinchieri | 364/200 |
| 4,380,798 | 4/1983 | Shannon et al. | 364/200 |
| 4,442,487 | 4/1984 | Fletcher et al. | 364/200 |
| 4,467,421 | 8/1984 | White | 364/200 |
| 4,574,346 | 3/1986 | Hartung | 364/200 |
| 4,658,351 | 4/1987 | Teng | 364/200 |
| 4,805,106 | 2/1989 | Pfeifer | 364/200 |
| 4,839,813 | 6/1989 | Hills et al. | 364/464.03 |

Primary Examiner—Thomas M. Heckler
Attorney, Agent, or Firm—Michael J. Scheer

[57] ABSTRACT

An input/output (I/O) test and set operation is provided for testing and changing data, e.g. flags in an access status record on DASD (Direct Access Storage Device) in one atomic I/O operation, which uses a string of standard channel command words (CCW) like Read, Write, Seek and Search in combination with additional records on DASD, containing the test and set values to be used by the CCW string. The I/O test and set operation is used in a Shared Disk facility (SDF) in a flagging protocol, for avoiding simultaneous and conflicting accesses from independent computer systems having access to the same physical DASD, thus realizing a disk sharing system at user or minidisk level.

14 Claims, 3 Drawing Sheets

FIG.2

| | KEY | DATA | | | |
|---|---|---|---|---|---|
| RECORD 1 | 01 | F1 | F1 | F2 | |
| | | 0 | 1 | 2 | --------884 |

| | KEY | DATA | | | |
|---|---|---|---|---|---|
| RECORD 2 | 02 | F1 | F0 | F1 | |
| | | 0 | 1 | 2 | --------884 |

------

| | KEY | DATA |
|---|---|---|
| RECORD n+1 | F1 | 00 |

------

| | KEY | DATA |
|---|---|---|
| RECORD 2n | D0 | F0 |

| | KEY | DATA |
|---|---|---|
| RECORD 2n+1 | D1 | F1 |

| | KEY | DATA |
|---|---|---|
| RECORD 2n+2 | D2 | F2 |

FIG.3

RECORD 1  KEY [01]  DATA [F1][F1][F2]                   
                          0   1   2  — — — — — — 884

RECORD 2  KEY [D1]  DATA [F1]

FIG.4

RECORD 1  KEY [01]  DATA [F1][F1][F1]
                          0   1   2  — — — — — — 884

RECORD 2  KEY [02]  DATA [F1][F1][F1]
                          0   1   2  — — — — — — 884

RECORD 3  KEY [F1]  DATA [00]

RECORD 4  KEY [D0]  DATA [F0]

RECORD 5  KEY [D1]  DATA [F1]

RECORD 6  KEY [D2]  DATA [F2]

METHOD OF CHANGING DATA ON DISK

BACKGROUND OF THE INVENTION

1. Field of the Invention

This invention generally relates to a method of setting or changing specific data entities in a record registered on disk through one atomic input/output (I/O) operation of a data processing system, and more particularly to a novel combination of a record format and a channel command word (CCW) string for performing such an I/O set or change operation in a single I/O access.

Furthermore, the invention provides a method of setting or changing specific data entities in a record on disk conditionally through an I/O operation in dependence on the value of the same or other data entities on disk as tested in the same atomic I/O operation and particularly to a record format and a channel command word (CCW) performing such an I/O test and set operation in a single I/O access.

The invention also relates to a shared disk facility (SDF) wherein said I/O test and set operation is used to avoid simultaneous and conflicting accesses from a plurality of independent computer systems having read and write access to the same physical disk storage devices.

2. Discussion of Related Art

Normally, at least two input/output operations of a data processing system are required to change specific data in a record registered on a disk or DASD (Direct Access Storage Device) while maintaining the rest of the record unaltered. The first I/O operation serves to transfer the entire record from disk to main memory, whereupon the data in memory is changed under control of a program running in the CPU, and subsequently the updated record is written back to the DASD in a second I/O operation, the new version overlaying the original.

In some instances it is desirable or even necessary to set or change data in a record registered on DASD under the guarantee that no other access takes place while the update is being made. Under such circumstances the above mentioned change in two successive I/O operations cannot be used, because other conflicting accesses might occur in between.

An example of the above is in a shared disk system, where a plurality of independent computer systems share one or more DASDs. Under a shared disk system, two or more independent computer systems have potential access to the same physical DASD. When a sharing system would need two successive I/O operations to update critical data on DASD, there would be a risk that another sharing system may start a conflicting update in between.

One solution of this problem has been to use the so-called "Reserve/Release" feature of DASD hardware, whereby upon an access from one system the entire DASD is excluded from all accesses of other systems.

In a single computer system, such as the IBM VM Operating System software, controlling DASD accesses maintains a DASD access status record in main memory containing flags for each minidisk (storage space allocated to one user) currently being accessed, and when a minidisk is flagged for writing by one user further access from other users is denied or suspended.

However, with shared DASD the participating computer systems have no access to the status records in each other's memories and, therefore, in a shared DASD system the access status record is maintained on the DASD itself.

Upon an access request for a minidisk on shared DASD, the corresponding flags in the status records on DASD have to be tested and to be changed or set in case the minidisk is available. When this change operation for updating the corresponding flag is effected in two or more I/O operations, other systems might access the same status record in between and initiate a conflicting update.

Under said "Reserve/Release" feature conflicting accesses are avoided by dedicating the DASD hardware-wise to the accessing system during the updating process, thus blocking the entire DASD, containing many megabytes of data, from any access by any other system until the updating process, including two or more I/O operations and the change under CPU control, has been completed. The accessing system first issues a DEVICE RESERVE command, through which the DASD is hardware-wise dedicated t other accessing system, whereupon the status record is read into memory with a first I/O operation, tested and changed if applicable under CPU control, and in a second I/O operation the status record is rewritten to DASD, whereupon a DEVICE RELEASE command is issued to make the DASD again accessible to other systems. And, if the test should not succeed at the first trial, further such attempts could be made until successful, each time blocking the device for some duration of time.

This rigorous blocking of the entire DASD has of course the disadvantage that all data on the DASD are temporarily inaccessible to other users on any other system during each update of the status record flags. This is the more undesirable in view of the extensive and ever increasing use of loosely coupled computer systems at large data processing facilities, resulting in an increasing use of shared DASD.

Another disadvantage of the known system is that the hardware blocking is maintained even if the accessing system should fail while holding the Device Reserve during the update operation, in which event interference of the operator is required to manually reset an outstanding Device Reserve. Until such interference, all data on the Reserved DASD, even the data to which access has been granted already, is unavailable to other users on other systems.

By contrast, with the I/O test and set operation of the present invention access flags on DASD can be tested and updated in one atomic I/O access operation, thus avoiding simultaneous and conflicting accesses and obviating the need for the Device Reserve/Release feature blocking the entire disk during the test and set operation.

In itself, a Test and Set instruction is a well-known tool operating on specific data bytes in memory for using the byte value in a conditional operation while setting the byte in memory to a predetermined value. Until now, however, test and set operations could not easily be realized in input/output operations of a data processing system.

SUMMARY OF THE INVENTION

The first object of the present invention is to provide a method for realizing an I/O change or set operation, allowing the change or setting of specific data in a record on DASD to a predetermined value, using one string of channel command words in a single atomic input/output (I/O) operation of a data processing system.

A second object of the invention is to provide a method for realizing an I/O test and set operation, allowing the change or setting of specific data in a record on DASD conditionally to a predetermined value in dependence on the value of the same or other specific data on said DASD, using one channel command word string in one atomic I/O operation.

A further object of the invention is to provide a method for realizing an I/O test and set operation, allowing the change or setting of specific data in a record on DASD conditionally to any one of a number of predetermined values in dependence on one or more values of said or other specific data on said DASD, using one channel command word string in one atomic I/O operation of a data processing system.

Another object of the invention is to provide a method for realizing a shared disk facility at minidisk level, under which said I/O test and set operation is used to test and set flags in an access status record on DASD, using one channel command word string in a single atomic I/O operation, thus avoiding simultaneous and conflicting accesses of two or more independent computer systems having access to the same physical disk devices.

According to the invention, specific data in a record on DASD are tested, changed or set by using unitary strings of standard channel command words like Seek, Set Sector, Search, Transfer In Channel, Read Data and Write Data, in combination with additional, predetermined records previously registered on DASD and containing the test values, or the set values to be used and manipulated by such channel command word string.

More specifically, according to the invention, at least one additional record containing the set value of data to be changed is registered on the DASD carrying the data record to be changed, while a CCW string is provided adapted to read said data record into a memory buffer, to read said additional record containing the set value into the memory buffer at the position of the data entity to be changed, and subsequently to write the changed record from memory back to DASD, overlaying the original record.

Furthermore, according to the invention, at least one first additional record containing a test value and at least one second additional record containing a set value are registered on the DASD carrying the data record being processed, while a CCW string is provided adapted to perform the following steps:

1. copying the data record to be changed from DASD into a main memory buffer by a Read Data CCW,
2. using the current value of a specified data entity of the record in memory as an argument for a Search Key CCW to check for the presence of the value against the predetermined key of said first additional record on DASD containing the test value for its key value,
3. in case the test value is found, Read said second additional record on DASD containing the set value into the copy of the data record in memory at the specified position of the data entity to be set,
4. re-writing the updated data record onto DASD with a Write Data CCW, overlaying the original record, thus effecting one atomic I/O test and set operation for updating a record registered on DASD.

According to the invention a number of test values and set values can be registered on DASD to change data on DASD selectively into one of a number of predetermined values conditionally, in dependence on any one or more of a number of test values.

BRIEF DESCRIPTION OF THE DRAWINGS

FIG. 2 shows the general layout of records on DASD as used in the shared DASD embodiment of the invention.

FIG. 3 shows a simplified layout of a data record on DASD with an additional record containing a set value used in the CCW-string to change part of said data record FIG. 4 shows a layout of access status records on DASD together with additional records containing test and set values used by a CCW-string to conditionally change flags in said access status record under the shared disk facility according to the invention.

DETAILED DESCRIPTION

Figure 1:
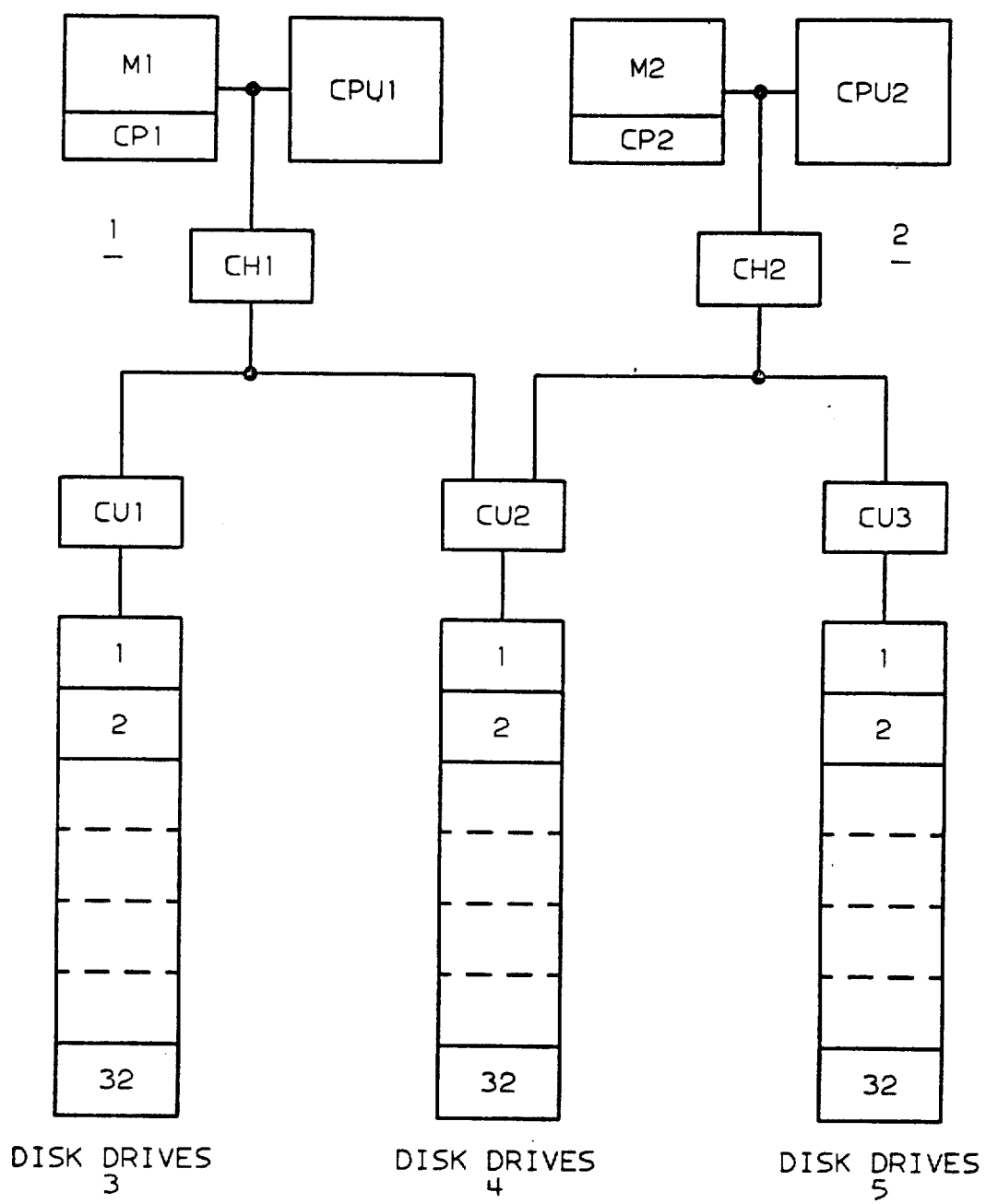
FIG. 1 shows a data processing environment of two loosely coupled computer systems sharing a number of DASDs.

The following description of a shared disk embodiment under the VM Operating System is intended to facilitate the understanding of the method of this invention by means of which data in a record on DASD are changed in a single atomic I/O operation, but it will be clear that the method of this invention may as well be applied under other Operating Systems and in any other application where data on DASD have to be changed or set in one I/O access.

Specific terms used with the VM Operating System are explained in the following description as far as needed for the understanding of the invention. For a full description reference is made to the following manuals:

| |
|---|
| Virtual Machine/System Product (often indicated as VM/SP or VM) |
| Virtual Machine/System Product General Information (Form No. GC20-1838) |
| VM LINK Command |
| Virtual Machine/System Product CP Command Reference for General Users (Form No. SC19-6211) under section LINK command |
| IBM System/370 or System/370 XA Processor |
| IBM System/370 System Summary: Processors (Form No. GA22-7001) |
| Input/Output (I/O) Operation |
| IBM System/370 Principles of Operation (Form No. GA22-7000) |
| Channel Command Word (CCW). |
| IBM System/370 Principles of Operation (Form No. GA22-7000) for general information IBM 3880 Storage Control (Form No. GA26-1661) for detailed information on typical DASD CCWs like SEEK, SET SECTOR, SEARCH, TIC, READ DATA, WRITE DATA, etc., in this case for an IBM 3880 |
| Direct Access Storage Device |
| IBM 3380 Direct Access Storage (Form No. GA26-1664) for specific information on the IBM 3380 DASD. |

DESCRIPTION OF THE PREFERRED EMBODIMENT

FIG. 1 shows schematically a data processing facility in which two computer systems 1 and 2 shared DASD (Direct Access Storage Device), i.e. both systems 1 and 2 have read and write access, through their respective I/O channels, to the same physical DASD units. The computer systems 1 and 2 may be the same or a different type of data processing system such as any IBM System/370 or System/370 XA processor.

As generally known, I/O channels serve to transfer code or data from DASD into memory or the reverse. Such transfers are necessary because the CPU can operate only on code and data present in memory. Channel operations are relatively slow with respect to the processing speed of the CPU, and in view of this the channel takes care of the preparation of DASD for the transfer, freeing the high speed CPU for other activities. When the I/O operation is completed, the CPU processing is interrupted by an I/O interrupt whereupon the CPU can operate on the data in memory.

In FIG. 1, computer system 1 consists of a Central Processing Unit CPU1 and a memory M1, CPU1 operates on code and data in memory M1, first of all on the code of an overall Control Program CP1 resident in memory. Basically, all further programs in system 1 are running under the ultimate control of the control Program CP1, such as VM/SP (Virtual Machine/System Product), which provides for the well known CMS (Conversational Monitor System).

is shown in FIG. 1 as CH1. Such channels are in fact separate processors controlling the access path to peripheral apparatus, in this case specific DASDs and preparing the DASD and its control unit for the actual data transfer to or from memory M1.

Channel CH1 is connected to a number of control units, two of which are shown in FIG. 1 as CU1 and CU2. Each control unit CU1 and CU2 controls the operation of up to 32 disk drives or DASDs, referenced in FIG. 1 as 3 and 4. Further I/O channels and control units for connecting other devices like terminals and communication controllers to the system are not relevant for the subject invention and have not been represented in FIG. 1.

In a physical DASD, data can be written on or retrieved a disk pack, consisting of one or more disks. During disk revolution information is written in a cylinder-shaped part of the disk pack, and such a cylinder of storage constitutes a unit of storage capacity allocated to the individual users. In VM/SP, one or more cylinders of disk storage assigned to a user are called a minidisk.

Similarly to system 1, system 2 consists of a CPU2 and memory M2 with Control Program CP2 resident in memory, while CH2 represents one of the I/O channels of system 2 with access to a number of control units, two of which are shown in FIG. 1 as CU2 and CU3, each controlling up to 32 DASDs, referenced in FIG. 1 as 4 and 5.

As an example of disk sharing, Channel CH1 of System 1 is connected to Control Unit CU2, while Channel CH2 of System 2 is connected to the same Control Unit CU2. Thus, up to 32 disk drives, controlled by CU2, are shared by the systems 1 and 2. Although not shown in FIG. 1, CU1 may also be connected to CH2 or another channel of system 2, while CU3 may also be connected to CH1 or another channel of system 1. If so desired, Computer System 1 and Computer System 2 may share all DASD units available.

SHARED DASD FACILITY (SDF)

As stated above, in a shared DASD facility where multiple loosely coupled systems have access to the same physical DASD, it is not sufficient when these individual systems keep track of existing accesses to the DASD in their memory. Those systems must have a way to communicate the status of accesses between each other, and one way of doing so is to store the status information (also called flags) on the DASD itself.

In each computer system, the Control Program (part of VM/SP) keeps track of the minidisk allocation for all its users, together with the current read and write accesses of these users to each minidisk, the minidisks being identified through the volume serial number of the DASD, the starting cylinder of the minidisk and the number of cylinders allocated to the specific minidisk. Each system does so in memory. Shared disk facility (SDF) is an addition to the Control Program for storing that status also on DASD and to check the status of other systems as recorded on DASD. For this purpose the method of this invention is used.

According to the invention the status records for each system, together with additional flag records, serving as prototypes, are stored on the DASD as control records on a specific track. The format of these records depends on what sort of status information has to be recorded and checked. In the preferred SDF embodiment, the system keeps track of both read and write accesses to each minidisk, from each participating computer system separately.

SDF CONTROL TRACK

FIG. 2 shows the general format of the SDF control information which is stored on cylinder 0 of each DASD to be shared. FIG. 2 shows the format for a situation where two or more, in general n, VM systems shared this DASD.

Each record on DASD consists of a Count field, a Key field, and a Data field of which in FIG. 2 only the Key and Data fields are shown.

Record 1 is the status record for System 1. It has a one-byte key of hexadecimal 01, used in a CCW-string to locate the record. The data portion of the record contains a flag byte position for each cylinder on the DASD (in this case 885 byte positions for an IBM 3380 device). These flag bytes each represent the access status for the associated minidisk on system 1. In this example, a flag byte of hexadecimal:

F0 means system 1 has READ access to that minidisk,
F1 means system 1 has NO access to that minidisk,
F2 means system 1 has WRITE access to that minidisk.

Status record 1 in FIG. 2 indicates that minidisk 2 has a current Write access, from system 1.

Record 2 is the status record for system 2. It has a key of hexadecimal 02, used in a CCW-string to locate the record. The format of the data portion of this record is exactly the same as for record 1. But, in this case each flag byte represents the access status to the corresponding minidisk through system 2.

For each sharing system a status record is registered on DASD. With n ($\geq 2$) sharing systems, control track 0 contains n status records. Records 3 to n are not represented in FIG. 2.

Record n+1 is a test control record, serving to test the value of the flag of a minidisk in a status record.

Record n+1 contains a key of hexadecimal F1 against which the test is done with a Search Key Equal CCW, as explained in the following. The data part of record n+1 is not relevant, but each DASD record must have at least one data byte, since a key cannot exist on its own.

Record n+2 (not shown) is a test control record, identical to record n+1 and serves to test the value of the flag in the next status record, as explained in the following. An accessing system need not test its own flag, and therefore n−1 identical test control records are provided for n sharing systems.

Records 2n to 2n+2 contain various set values as prototypes for the flag bytes in the status records 1 and 2.

Record 2n is the READ access flag. It has a key of hexadecimal D0, used in a CCW-string to locate the record. The data portion (hexadecimal F0) of the record is the flag byte which represents the READ access status.

Record 2n+1 is the NO access flag, indicating that no access to the minidisk exists. It has a key of hexadecimal D1, used in a CCW-string to locate the record. The data portions (hexadecimal F1) of the record is the flag byte which represents the NO access status.

Record 2n+2 is the WRITE access flag. It has a key of hexadecimal D2, used in a CCW-string to locate the record. The data portion (hexadecimal F2) of the record is the flag byte which represents the WRITE access status.

It should be noted that the key values given above for the flag records 2n through 2n+2 are not essential, and other values will serve as well provided they are distinct and are lower than the three flag values which are used. Also, the sequence of the flag records is immaterial provided they come behind the test control records n+1 through 2n−1.

CCW STRING TO CHANGE PART OF A RECORD

The unconditional changing or setting of a part of a record in one I/O operation illustrates the method of this invention in its most elementary form. The operation is used in the shared disk facility to reset a Write or Read flag to the NO access status (or a Write to a Read status, if desired).

FIG. 3 shows the basic record format on DASD for realizing the I/O change operation. Record 1 may be the same as record 1 of System 1 in FIG. 2, having a Key of hexadecimal 01 and a data portion with flags of hex F1, F1 and F2 for minidisk 0, 1 and 2, etc. In FIG. 3, additional record 2 on the DASD contains the set value for the NO access flag and has a key of hex D1 and a data portion hex F1.

The following Listing A shows the CCW-string which, according to the invention, is used to reset the flag byte F2 for cylinder 2 (minidisk 2) by replacing it with F1 of record 2 in one I/O operation. In the SDF environment this operation would be executed by System 1 when an access to a minidisk is terminated an no more accesses to that minidisk exist on System 1.

| LISTING A | |
|---|---|
| SEEK | Cylinder 0 Track 1 |
| SET SECTOR | 0 |
| SEARCH KEY EQ | Key 01 (status record system 1) |
| TIC | *-8 |

| -continued | |
|---|---|
| LISTING A | |
| READ DATA | status record 1 (F1, F1, F2, ... copied into memory) |
| SEARCH KEY EQ | Key D1 (NO access flag) |
| TIC | *-8 |
| READ DATA | Record 2 (flag F1) into copy of status record 1 of system 1 at offset 2 (prepares the updated status) |
| SET SECTOR | 0 |
| SEARCH KEY EQ | Key 01 (status record system 1) |
| TIC | *-8 |
| WRITE DATA | updated status record system 1 |

The operation of this string of standard channel command words is as follows:

1. The SEEK command is used to position the READ/WRITE mechanism of the DASD on the correct Cylinder and Track. In this case, Cylinder 0 Track 1.
2. The SET SECTOR command is not relevant to the invention, but it is used to free some pieces of the I/O hardware (Channel and Control Unit) while the disk drive of this example (in this case an IBM 3380) rotates, until the READ/WRITE mechanism is at the beginning of the track.
3. The SEARCH KEY EQUAL command is used to locate the status record of the issuing system, in this case the VM/SP Control Program on system 1.
4. The TIC (Transfer In Channel) command ensures that the previous SEARCH KEY EQUAL command is repeated until one of two conditions occurs:
   a. The record is found on the track. In this case, the I/O hardware will skip the TIC command and continue with the CCW after the TIC command (in this case a READ DATA command).
   b. The record is not found anywhere on the track. In this case, the I/O hardware stops execution of the CCW-string and interrupts the CPU with an error condition indicating that the record could not be found.

Here, the status record of system 1, i.e. record 1 of FIG. 3 will be found.

5. The READ DATA command reads the status record located by the previous SEARCH KEY EQUAL, in this case the status record of the issuing system 1. Upon completion of this CCW, a copy of the status record of system 1 is in the memory of system 1.
6. The next SEARCH KEY EQUAL command is used to locate the NO access flag, which has a key of hexadecimal D1, shows as record 2 in FIG. 3.
7. The next TIC command ensures that the previous SEARCH KEY EQUAL command is repeated until the record is found or the search is found to be unsuccessful, as has been explained under 4 above.
8. The next READ DATA command is used to read the NO access flag into the memory of system 1. The memory location where the one byte flag is to be stored is specified in the CCW, and in this case that location is at offset 2 (i.e. the 3rd byte) in the status record which was read into memory with the previous READ DATA command. This position in the status record represents the access status of system 1 with regard to the minidisk starting on cylinder 2 of this DASD.
9. The next SET SECTOR command again is not relevant to the invention, but is used to free some pieces of the I/O hardware, as explained under point 2.

10. The next SEARCH KEY EQUAL command is used to locate the status record for system 1 again.
11. The next TIC command will ensure the status record is found.
12. The next WRITE DATA command now writes back an updated status record for system 1.

Through the use of the additional record 2 in combination with this CCW-string the flag in offset 2 of record 1 has been reset, which operation normally requires two I/O accesses.

CCW-STRING TO CHECK AND CHANGE PART OF A RECORD

The following Listing B shows the CCW-string, which, according to the invention, is used to check and, depending on the result of that check, change a data record or part of a data record (one flag byte in this case) in a single atomic I/O operation. In the Shared Disk Facility under the VM system, this action has to be executed when access to a minidisk is requested via the LINK command (a VM/SP command). Such an access request can only be granted if the access status of other users on any of the sharing systems does not prevent it. Thus, the flag byte has to be set to the READ or WRITE access value, but only if no prohibitive READ or WRITE access exists on any of the sharing systems.

In the example, two sharing systems 1 and 2 are assumed, of which System 1 wants to access minidisk 2.

FIG. 4 shows the format of the records in the SDF control track. Record 1 is again the status record of System 1, but now a NO access flag in flag position 2 is assumed, as shown in FIG. 4.

Similarly, Record 2 constituting the status record of System 2, is arbitrarily shown to have NO access flags in all byte positions.

Record 3 is the test control record, serving to test the value of a flag. As before, this record has a key of hex F1 against which the check will be made, while the data part is irrelevant. Only one test control record is required for two sharing Systems 1 and 2.

Records 4, 5 and 6 contain the various set values for respectively the Read, NO access and Write flags, as before.

| LISTING B | |
|---|---|
| SEEK | Cylinder 0 Track 1 |
| SET SECTOR | 0 |
| SEARCH KEY EQ | Key 01 (status record system 1) |
| TIC | *-8 |
| READ DATA | status record system 1 (F1, F1. F1, . . . into memory) |
| SEARCH KEY EQ | Key 02 (status record system 2) |
| TIC | *-8 |
| READ DATA | status record system 2 (F1, F1, F1, . . . into memory) |
| SEARCH KEY EQ OR HI | argument offset 2 (takes argument F1 from copy of record 2) |
| TIC | *-8 (Processing ends if SKEH is not successful) |
| SEARCH KEY EQ | key D2 (WRITE access flag) |
| TIC | *-8 |
| READ DATA | Record 6 (flag F2) into copy of status record 1 of system 1 at offset 2 (prepares the updated status) |
| SET SECTOR | 0 |
| SEARCH KEY EQ | Key 01 (status record system 1) |
| TIC | *-8 |
| WRITE DATA | updated status record system 1 |

The example shows the CCW-string used when a LINK M is requested by System 1 for a minidisk starting on cylinder 2. A LINK M according to VM/SP rules will grant WRITE access to a minidisk, but only if no other WRITE access exists. Other READ accesses will not cause the link request to be denied. The control track has to be formatted as shown in FIG. 2 or 4. The CCW-string does the following:

1. The SEEK command is used to position the READ/WRITE mechanism of the DASD on the correct Cylinder and Track. In this case Cylinder 0 Track 1.
2. The SET SECTOR command is not relevant to the invention, but it is used to free some pieces of the I/O hardware (Channel and Control Unit), while the disk drive of this example (in this case an IBM 3380) rotates, until the READ/WRITE mechanism is at the beginning of the track.
3. The SEARCH KEY EQUAL command is used to locate the first status record, in this case the status record of system 1.
4. The TIC command ensures that the previous SEARCH KEY EQUAL command is repeated until the record has been found or the search is declared unsuccessful, as explained before.
5. The READ DATA command reads the status record located by the previous SEARCH KEY EQUAL, in this case the status record of system 1. At the completion of this CCW, a copy of the status record of system 1 is in memory of system 1.
6. The next SEARCH KEY EQUAL and TIC commands are used to locate the second status record, in this case the status record of system 2. Again two conditions (found or not found) may occur, but in this case the record is found.
7. The next READ DATA command reads the status record located by the previous SEARCH KEY EQUAL, in this case the status record of system 2. At the completion of this CCW, a copy of the status record of system 2 is in the memory of system 1.
8. The next SEARCH KEY EQUAL OR HIGH command is used to check the status of the flag byte of system 2 for the minidisk starting on cylinder 2 of this DASD. As argument for the SEARCH KEY EQUAL OR HIGH command, the flag byte representing the minidisk starting on cylinder 2 (3rd byte) in the status record of system 2 (which is now temporarily in the memory of system 1) is used. In this example, this flag byte may have one of 3 hexadecimal values:
   F0 means system 2 has READ access to that minidisk,
   F1 means system 2 has NO access to that minidisk,
   F2 means system 2 has WRITE access to that minidisk.
9. The next TIC command ensures that the previous SEARCH KEY EQUAL OR HIGH command is repeated until one of two conditions occurs:
   a. A record, to wit the test control record 3, is found on the track. In other words, a key with a value equal to or higher than the one specified in the SEARCH KEY EQUAL OR HIGH (flag byte at offset 2 in status record of system 2) is found. This means that system 2 has a flag byte of value F0 or F1, indicating that no WRITE access exists. In this case, the I/O hardware will skip the TIC command and continue with the CCW after the TIC command.
   b. The record is not found anywhere on the track. In this case this means that system 2 has a flag byte of value F2, indicating an existing WRITE ACCESS.

In this case, the I/O hardware stops execution of the CCW-string and interrupts the CPU with an error condition indicating that the record could not be found.

In the example shown, the initial status flag of system 2 contains value F1 (NO access), so the record is found.

In the case that access is to be only allowed if no accesses exist on any other system, the SEARCH KEY EQUAL OR HIGH has to be replaced by a SEARCH KEY EQUAL, so that the SEARCH KEY also fails if the flag byte on the other system(s) has a value of F0 (READ access). This is the case if a user requests a LINK W for instance.

It is noted that the following part of the CCW-string (to effectuate a change in the status record of the issuing system, system 1 in this case), will only be executed if the test in the previous part of the CCW-string is successful.

10. The next SEARCH KEY EQUAL and TIC commands are used to locate the WRITE flag, which has a hexadecimal key of D2. In this case, the record 6 of FIG. 4 will be found.
11. The next READ DATA command is used to read the WRITE access flag into the memory of system 1. The memory location where the one byte flag is to be stored is specified in the CCW, and in this case that location is at offset 2 (3rd byte) in the status record of the issuing system (in this case system 1) which was read into memory with a previous READ command. This position in the status record represents the access status of system 1 with regard to the minidisk starting on cylinder 2 of this DASD.
12. The next SET SECTOR command again is not relevant to the invention, but it is used to free some pieces of the I/O hardware (Channel and Control Unit) as before.
13. The next SEARCH KEY EQUAL command is used to locate the status record for the issuing system (system 1 in this case) again.
14. The next TIC command will ensure the status record is found.
15. The next WRITE DATA command now writes back an updated status record for the issuing system, system 1 in this case.

With the above CCW-string in combination with the additional test and set records on the DASD the flag F1 in offset 2 of status record 1 has been set to F2 in a single atomic I/O operation with the guarantee that no other simultaneous and conflicting access did occur.

In the same way, System 2 will use a similar CCW-string to change a part of its status record 2 in one I/O operation upon testing the relevant flag in the status record 1 of System 1.

With n sharing systems, n being higher than two, status records for all n systems are registered on each shared DASD. Upon an access request from a user of one system for a specific minidisk on a shared DASD, this system will read all n status records into main memory and test the status records of all other sharing systems for an access flag in the relevant minidisk position in the way described above. When the minidisk is available, the accessing system sets an access flag in the relevant minidisk position of its own status record.

This implies that the testing operation in the CCW string is repeated for n−1 systems, and preferably n−1 additional test records should be registered in each DASD control track to effectuate a fast searching operation for all systems in one revolution.

In the examples only one shared disk control unit has been shown and discussed for clarification purposes, but it will be clear that the method of the invention allows sharing of all DASDs, while the number of sharing systems has limitations for practical purposes only.

In case one of the sharing systems fails the shared DASDs remain accessible to the other systems as far as minidisks have not been flagged by the failing system. Also, these flags of the failing system can be reset with one command.

The design of CCW-strings used in combination with additional test and set records on DASD has been explained for testing and setting of flag bytes in a shared disk system under the VM Operating System, but the method of this invention is not limited to this application or this Operating System.

We claim:

1. A method for changing a specified part of a target-record, said target-record being one of a plurality of data records, stored on a Direct Access Storage Device (DASD), through an uninterrupted input/output (I/O) operation of a peripheral control system, said method comprising the steps of:
   receiving, at said peripheral control system, a request for changing said specified part;
   reading said target-record from said DASD into memory to form a copy thereof;
   reading one of said data records denoted as a set-record from said DASD, said set-record having a change-value;
   overlaying said change-value upon said copy where said specified part is to be changed to form a changed-record; and
   writing said changed-record onto said DASD, overlaying said target-record.

2. A method of conditionally changing a specified part of a target-record, said target-record being one of a plurality of data records stored on a Direct Access Storage Device (DASD) through an uninterrupted input/output (I/O) operation of a peripheral control system, said DASD further having a plurality of additional records, said method comprising the steps of:
   receiving, at said peripheral control system, a request for conditionally changing said specified part;
   reading said target-record from said DASD into memory to form a copy thereof;
   searching said DASD for one of said additional records denoted as a test-record, said test record having a key corresponding to a test-value, and skipping all subsequent steps of this method if said test-record is not found;
   reading one of said additional records denoted as a set-record form said DASD, said set-record having a change value;
   overlaying said change-value upon said copy where said specified part is to be changed in order to form a changed-record; and
   writing said changed-record onto said DASD, overlaying said target-record.

3. A method of conditionally changing a specified part of a target-record, said target record being one of a plurality of data records stored on a Direct Access Storage Device (DASD), in accordance with the method of claim 2 wherein said test-value is a part of said target-record.

4. A method of conditionally changing a specified part of a target-record, said target-record being one of a plurality of data records stored on a Direct Access Storage Device (DASD), in accordance with the method of claim 2 wherein said test-value is a part of another of said plurality of data records stored on DASD.

5. In a shared disk facility having at least two independent computer systems and at least one Direct Access Storage Device (DASD) having a plurality of records and user storage allocations, at least one of said records being a test-record having a key corresponding to a specified access status, a method for avoiding concurrent and conflicting accesses from said independent computer systems to said DASD comprising the steps of:

a. receiving, at a peripheral control system, an access request from one of said independent computer system for access to a specific user storage allocation on said DASD, said independent computer being a requesting computer and all other said independent computer systems in said shared disk facility system being non-requesting computer systems;

b. reading from said DASD a requesting computer system status record in order to form a first copy, both said original requesting computer system status record, and said first copy having status flags indicating existing access to each of said user storage allocations on said DASD, one of said status flags being a first status flag, said first status flag reflecting said requesting computer system's access status to said specific user storage allocation;

c. reading from said DASD an original non-requesting computer system status record in order to form a second copy, both said original non-requesting computer system status record and said second copy having status flags indicating existing accesses to each of said user storage allocations on said DASD, one of said status flags being a second status flag, said second status flag reflecting said non-requesting computer system's access status to said specific user storage allocation;

d. searching said DASD for said test-record having a key related to said second status flag;

e. denying said access request when said search for said test-record is unsuccessful, said unsuccessful search indicating a conflicting access with said non-requesting computer system;

f. writing an update value into said first status flag of said first copy to form an updated copy when said specific test-record is found, said update value indicating that said requesting computer system has access to said specific user allocation on said DASD; and g. writing said updated first copy onto said DASD, overlaying said original requesting computer system status record.

6. A method according to claim 5, wherein said plurality of records includes at least one non-requesting computer system status record for each of said non-requesting computer systems in said shared disk facility system, said method further comprising the steps of:
 repeating step c. for each of said non-requesting computer system status records; and
 repeating steps d. through f. for each of said non-requesting computer system status records.

7. A method according to claim 5 wherein said update value is obtained by reading from said DASD a set-record, said set-record containing said update value.

8. A method according to claim 5 wherein a plurality of specific test records reside on said DASD, each of said specific test records having the same said key corresponding to said specific access status.

9. A method according to claim 5 wherein said specific access status reflects a no-access status.

10. A method according to claim 9 wherein said searching step searches for said test-record with said key corresponding exactly to said second status flag.

11. A method according to claim 9 wherein said searching step searches for said test-record with said key equal to or greater than said second status flag.

12. A method of conditionally changing a specified part of a target-record, being one of plurality of data records stored on a Direct Access Storage Device (DASD) through an uninterrupted input/output (I/O) operation of a peripheral control system, said DASD further having a plurality of additional records, said method comprising the steps of:
 receiving, at said peripheral control system, a request for conditionally changing said specified part;
 reading said target-record from said DASD into memory to form a copy thereof;
 searching said DASD for one of said additional records denoted as a test-record, said test record having a key corresponding to a test-value, and skipping all subsequent steps of this method if said test-record is not found;
 altering said memory at the location where said specified part is to be changed, thereby forming a changed copy of said target-record denoted as a changed-record; and
 writing said changed-record onto said DASD, overlaying said target-record.

13. A method of conditionally changing a specified part of a target-record, said target record being one of plurality of data records stored on a Direct Access Storage Device (DASD), in accordance with the method of claim 12 wherein said test-value is a part of said target-record.

14. A method of conditionally changing a specified part of a target-record, said target-record being one of a plurality of data records stored on a Direct Access Storage Device (DASD), in accordance with the method of claim 12 wherein said test-value is a part of another of said plurality of data records stored on DASD.

* * * * *